United States Patent
Huang et al.

(10) Patent No.: US 10,114,658 B2
(45) Date of Patent: Oct. 30, 2018

(54) CONCURRENT TESTING OF PCI EXPRESS DEVICES ON A SERVER PLATFORM

(71) Applicant: Baidu USA LLC, Sunnyvale, CA (US)

(72) Inventors: Davy Huang, San Jose, CA (US); Krishna Elango, San Ramon, CA (US); Xu Zhou, San Francisco, CA (US)

(73) Assignee: Baida USA LLC, Sunnyvale, CA (US)

( * ) Notice: Subject to any disclaimer, the term of this patent is extended or adjusted under 35 U.S.C. 154(b) by 185 days.

(21) Appl. No.: 15/162,529

(22) Filed: May 23, 2016

(65) Prior Publication Data
US 2017/0337069 A1    Nov. 23, 2017

(51) Int. Cl.
| | |
|---|---|
| *G06F 11/00* | (2006.01) |
| *G06F 9/4401* | (2018.01) |
| *G06F 13/42* | (2006.01) |
| *G06F 13/40* | (2006.01) |
| *G06F 11/30* | (2006.01) |
| *G06F 11/22* | (2006.01) |

(52) U.S. Cl.
CPC .......... *G06F 9/4411* (2013.01); *G06F 11/221* (2013.01); *G06F 11/2221* (2013.01); *G06F 11/3027* (2013.01); *G06F 13/4022* (2013.01); *G06F 13/4282* (2013.01)

(58) Field of Classification Search
CPC .......... G06F 13/10; G06F 13/20; G06F 13/24; G06F 13/102; G06F 13/4022; G06F 13/4081; G06F 13/4095; G06F 1/26; G06F 11/0793; G06F 11/0766; G06F 11/0748
See application file for complete search history.

(56) References Cited

U.S. PATENT DOCUMENTS 5,701,409 A * 12/1997 Gates .................... G06F 11/221
714/30
5,712,967 A * 1/1998 Grossman ........... G06F 11/2221
714/3

(Continued)

OTHER PUBLICATIONS

Bjørlykke, "PCIe Device Lending" 2015, University of Oslo, p. 1-96 (Year: 2015).*

(Continued)

*Primary Examiner* — Bryce P Bonzo
*Assistant Examiner* — Jeison C Arcos
(74) *Attorney, Agent, or Firm* — Womble Bond Dickinson (US) LLP

(57) ABSTRACT

A method for testing peripheral component interconnect express (PCIe) devices is provided. The method implemented at a PCIe testing system detects that one or more PCIe devices have been inserted into one or more PCIe buses of a data processing system. In response to the detection, the PCIe testing system scans all PCIe buses of the data processing system to discover the one or more PCIe devices. For each of the PCIe devices discovered, the PCIe testing system repairs and retrains a PCIe link associated with the PCIe device, without rebooting the data processing system. The PCIe testing system loads a device driver instance for the PCIe device to be hosted by an operating system. The PCIe testing system then executes a test routine to concurrently test the one or more PCIe devices via the respective device driver instances.

24 Claims, 8 Drawing Sheets

(56) References Cited

U.S. PATENT DOCUMENTS

| | | | | |
|---|---|---|---|---|
| 5,768,612 | A * | 6/1998 | Nelson | G06F 13/4027 710/315 |
| 5,991,900 | A * | 11/1999 | Garnett | G06F 13/4027 714/3 |
| 6,070,207 | A * | 5/2000 | Bell | G06F 13/4081 370/402 |
| 6,173,346 | B1 * | 1/2001 | Wallach | G06F 1/20 710/100 |
| 6,212,585 | B1 * | 4/2001 | Chrabaszcz | H04L 29/06 709/220 |
| 6,247,079 | B1 * | 6/2001 | Papa | G06F 1/20 710/302 |
| 6,247,080 | B1 * | 6/2001 | Wallach | G06F 1/20 710/302 |
| 6,343,260 | B1 * | 1/2002 | Chew | G06F 11/221 702/122 |
| 6,363,452 | B1 * | 3/2002 | Lach | G06F 13/4081 710/302 |
| 6,401,157 | B1 * | 6/2002 | Nguyen | G06F 13/4081 710/302 |
| 6,418,492 | B1 * | 7/2002 | Papa | G06F 13/4027 710/302 |
| 6,499,073 | B1 * | 12/2002 | Wallach | G06F 1/26 710/301 |
| 6,532,558 | B1 * | 3/2003 | Allen | G06F 13/409 714/724 |
| 6,557,121 | B1 * | 4/2003 | McLaughlin | G06F 11/221 714/43 |
| 7,260,749 | B2 * | 8/2007 | Cox | G06F 11/0745 710/100 |
| 7,475,178 | B2 * | 1/2009 | Rubin | G06F 13/4072 710/110 |
| 9,026,687 | B1 * | 5/2015 | Govande | G06F 13/10 710/10 |
| 2002/0138782 | A1 * | 9/2002 | Durrant | G06F 11/0727 714/2 |
| 2004/0008034 | A1 * | 1/2004 | Mastoris | G01R 31/2806 324/538 |
| 2005/0149658 | A1 * | 7/2005 | Martin | G06F 13/385 710/302 |
| 2005/0235187 | A1 * | 10/2005 | Lai | G01R 31/31716 714/733 |
| 2006/0114918 | A1 * | 6/2006 | Ikeda | H04L 45/02 370/408 |
| 2006/0168377 | A1 * | 7/2006 | Vasudevan | G06F 13/4081 710/104 |
| 2009/0083585 | A1 * | 3/2009 | Liu | G06F 11/26 714/43 |
| 2009/0094401 | A1 * | 4/2009 | Larson | H04L 45/00 710/316 |
| 2009/0210606 | A1 * | 8/2009 | Feehrer | G06F 13/24 710/313 |
| 2011/0029695 | A1 * | 2/2011 | Kishore | G06F 13/4022 710/9 |
| 2012/0131253 | A1 * | 5/2012 | McKnight | G06F 1/30 710/308 |
| 2013/0042019 | A1 * | 2/2013 | Galles | H04L 29/00 709/232 |
| 2013/0086292 | A1 * | 4/2013 | Hsieh | G09G 5/006 710/302 |
| 2013/0205053 | A1 * | 8/2013 | Harriman | G06F 13/4022 710/105 |
| 2014/0156898 | A1 * | 6/2014 | Luo | G06F 13/4081 710/302 |
| 2016/0147705 | A1 * | 5/2016 | Arroyo | G06F 13/4282 714/15 |
| 2016/0291986 | A1 * | 10/2016 | Warkentin | G06F 9/4411 |
| 2016/0377679 | A1 * | 12/2016 | Froelich | H04B 3/46 714/735 |

OTHER PUBLICATIONS

Intel "Intel® 5000 Series Chipset Memory Controller Hub (MCH)" Sep. 2009, p. 1-30 (Year: 2009).*

PCI-SIG, "PCI Express® Base Specification Revision 3.0" Nov. 10, 2010, PCI-SIG, p. 1-806 (Year: 2010).*

PCI, "PCI Hot-Plug Specification" Jun. 20, 2001, PCI Rev. 1.1 p. 1-40 (Year: 2001).*

Nie, "PCI Express®Gen 2 Deep Dive on Power Architecture®" Jun. 2010, Freescale Semiconductor, p. 1-41 (Year: 2010).*

* cited by examiner

CONCURRENT TESTING OF PCI EXPRESS DEVICES ON A SERVER PLATFORM

FIELD OF THE INVENTION

Embodiments of the present invention relate generally to computer peripheral devices. More particularly, embodiments of the invention relate to testing peripheral component interconnect express (PCIe) devices.

BACKGROUND

High-speed data communication is a prominent factor in computer systems. There has been a need of a higher-bandwidth, faster-speed interconnect technology for computer systems and peripherals. The Peripheral Component Interconnect (PCI) Express (PCIe) interface protocol is quickly becoming a widely used standard across the computer industry for a high-speed data communication link. The production flow of PCIe devices often involves a testing procedure that is conducted on a production line in a manufacturing facility. As a result, there has also been a need for optimizing such a testing procedure to reduce the testing time that is required to maintain a high yield for the production line and thus reduce manufacturing costs.

Conventionally, when multiple PCIe devices need to be tested, a PCIe tester is required to test one PCIe device at a time. A testing procedure of a PCIe device usually involves inserting the PCIe device under the test (DUT) into a selected PCIe slot on a CPU server platform, turning on the server's power to scan and recognize the PCIe device and then allocate and configure hardware resources (memory, interrupts, etc.) to work with the identified device, installing a low level device driver to enable the software application program interface (API) to call the PCIe device, and running a test program to execute test routines targeting the PCIe device. However, after running the test program, the PCIe tester is required to power off the server, unplug the tested PCIe device, and prepare the second PCIe device to be tested.

Accordingly, each of these steps is time consuming and increases manufacturing costs due to hardware and/or software limitations. As such, what is needed to overcome the described shortcomings is a time-efficient method for testing one or more PCIe devices concurrently.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
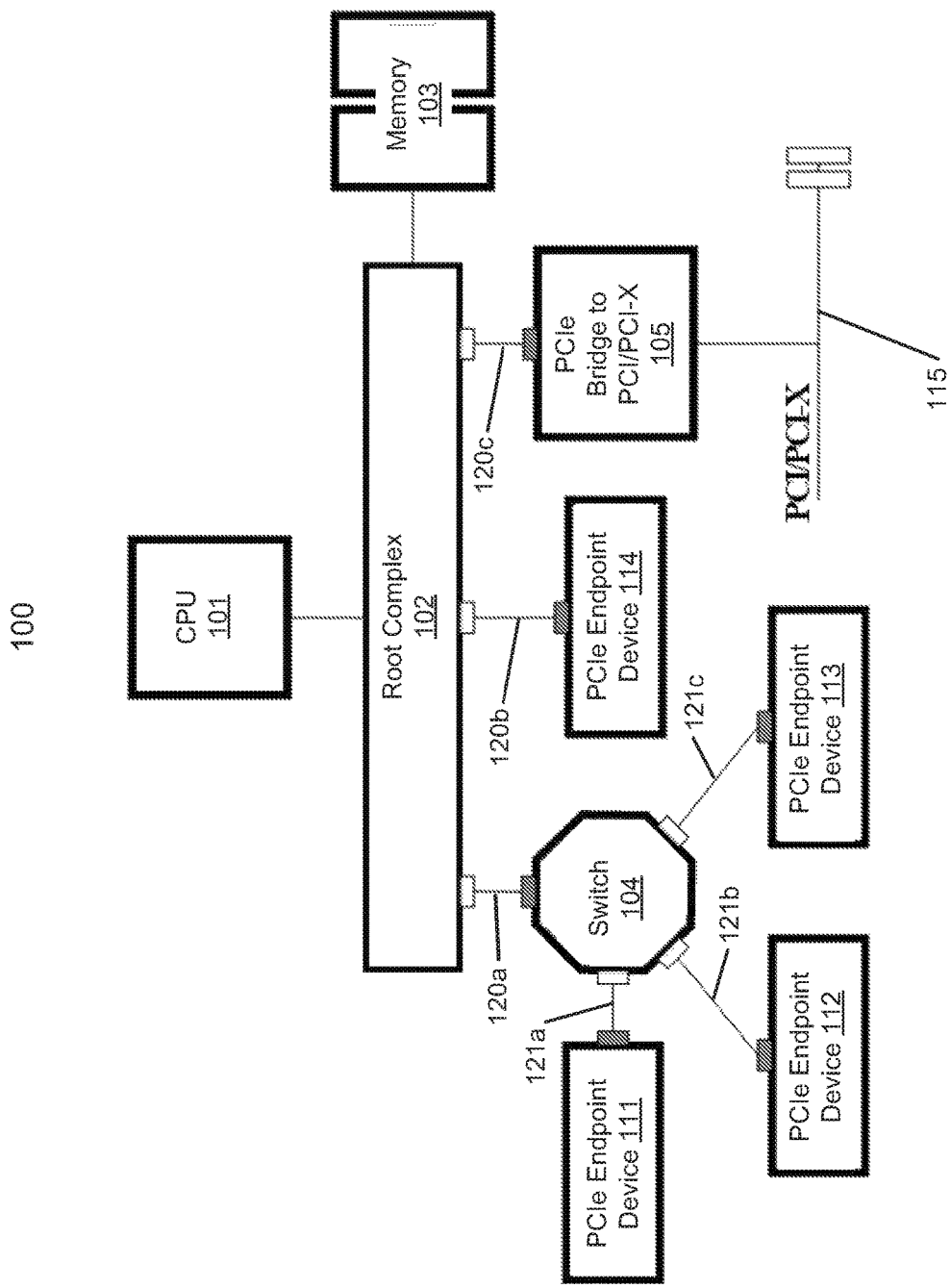
FIG. 1 is a block diagram illustrating an example of a PCIe communication system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, methods and systems for testing one or more PCIe devices concurrently are utilized. In one embodiment, a system for testing PCIe devices (also referred to as a PCIe testing system) detects one or more PCIe devices (e.g., PCIe cards) that have been inserted into one or more PCIe buses of a data processing system. In response to the detection, the system for testing PCIe devices scans all PCIe buses of the data processing system to discover the one or more PCIe devices. Further, for each of the discovered PCIe devices, the testing system repairs and retrains a PCIe link associated with the respective PCIe device, without rebooting the data processing system, and then loads a device driver instance for the PCIe device to be hosted by an operating system (OS). In one embodiment, the testing system then executes a test routine to concurrently test the one or more PCIe devices via respective device driver instances. As such, this PCIe testing system reduces manufacturing costs and the overall testing time, as multiple PCIe devices are tested concurrently and every percentage point of improvement per unit adds to the reduction of the overall testing time.

Further, in one embodiment, to load a device driver instance, the PCIe testing systems assigns a logical device identifier (ID) representing the PCIe device to the device driver instance, where the logical device ID is constructed based on a combination of one or more of a bus number, a device number, and/or a function number of the PCIe device. In one embodiment, the logical device ID is utilized by the device driver instance to identify a physical PCIe slot in which the PCIe device is inserted, such that the one or more PCIe devices can be concurrently identified and tested.

According to one embodiment, in response to a signal indicating that the execution of the test routine has been completed, the PCIe testing system unloads the device driver instances of the PCIe devices. Further, the PCIe testing system communicates with the operating system to remove the PCIe devices from a namespace of the operating system, without rebooting the data processing system. In one embodiment, the PCIe testing system may display a message to prompt a user (e.g., a tester and an operator) that the PCIe devices can be physically removed from corresponding PCIe slots.

In one embodiment, to repair and retrain a PCIe link that is associated with the PCIe device, the PCIe testing system sets a first clock configuration bit in a first PCIe link control register of the PCIe device, and sets a second clock configuration bit in a second PCIe link control register of a respective root complex device that is coupled to the PCIe device to recover a PCIe reference clock configuration. The PCIe testing system may also set a retrain link bit in the second PCIe link control register of the root complex device to trigger a PCIe link retraining process, recover settings of a PCIe device control register of the PCIe device, and clear any error in a PCIe configuration space that is reported during PCIe bus scanning. In one embodiment, the PCIe testing system then copies memory address settings from the root complex device to a PCIe configuration space of the PCIe device.

Accordingly, one of the advantages of testing multiple PCIe devices concurrently is that it reduces the overall resources, costs, and time consumption that are involved with a server platform. As such, this PCIe testing system provides a set of procedures and hardware mechanisms that enable an OS to automatically recognize one or more PCIe devices, without the need of rebooting a data processing system (e.g., a server). According to some embodiments, a PCIe testing system can provide the hot-plug capability on the PCIe devices, which is usually a system-level option that is not implemented because it requires dedicated hardware circuits built both on the DUT and the PCIe testing system. Thus, the hot-plug capability of the PCIe testing system provides an efficient mechanism to remove the tested PCIe devices and replace the new PCIe devices that are needed, without rebooting the server. However, the procedure and hardware configuration described in the embodiments herein do not require full PCIe hot-plug capability, but require some dedicated hardware circuits built on the DUT to enable hot-plugging PCIe devices in the system. Lastly, another advantage provided by the PCIe testing system is that it provides a fixed mapping system between device driver instances and their actual physical locations in the data processing system. This allows the fixed mapping system to distinguish multiple PCIe devices when they are loaded in the OS at the same time and thus properly log the PCIe test results of multiple PCIe devices.

FIG. 1 is a block diagram illustrating an example of a PCIe communication system according to one embodiment of the invention. PCIe communication system 100 may be implemented as part of system 200. As used herein, a "PCIe" refers to a high-speed serial computer expansion bus standard used to connect a computer (also referred to as a central processing unit (CPU), a computing device, a server, a data processing system, etc.) to one or more peripheral devices (e.g., PCIe devices 111-114) based on a point-to-point topology. As such, a "PCIe testing system" refers to a method and/or a system for testing one or more PCIe devices at the same time.

As used herein, the PCIe testing system also refers to a testing configuration that includes hardware and/or software components that enable concurrent testing of multiple PCIe devices on one or more servers (also referred to as a server platform). For example, the hardware components include circuits on a printed circuit board (PCB) that enable safe hot-plug of one or more PCIe cards onto one or more PCIe slots of the server. Further, for example, the software components (also referred to as software modules) include device drivers, scripts, and/or testing operation procedures that enable an OS to discover multiple PCIe cards when they are hot-plugged onto the server. The software components allow the OS to distinctly identify and register each PCIe card, repair and retrain one or more PCIe links associated with the one or more discovered PCIe devices without having to reboot the server, and execute a test routine to concurrently test on the one or more discovered PCIe cards.

Referring now to FIG. 1, in one embodiment, PCIe communication system 100 includes, but is not limited to, root complex 102 communicatively coupled to CPU 101, memory 103, switch 104, PCIe bridge 105, and PCIe endpoint devices 111-114. Further, PCIe communication system 100 includes one or more PCIe buses 120*a-c* and 121*a-c*, as well as PCIe Bridge to PCI/PCI-X bus 115 that dynamically reconfigures PCIe bus 120*c* to provide a connection between a PCIe link and a PCI/PCI-X link. PCIe buses 120-121 are used for connecting PCIe endpoint devices 111-114, but are enhanced so that the status of a PCIe endpoint device (e.g., PCIe endpoint device 111) may be detected and the bandwidth for that endpoint rerouted if not needed for that endpoint. Further, PCIe buses 120-121 are logical connections that may be referred to as interconnects or links, which are used to connect one or more PCIe endpoint devices. A link is a point-to-point communication channel between two PCIe ports that allows both ports to send and receive PCIe requests (e.g., configuration, IO or memory read/write) and interrupts (e.g., INTx, MSI or MSI-X). At the physical level, a link is composed of one or more lanes. For example, a low-speed peripheral device (e.g., an 802.11 Wi-Fi card) uses a single-lane (×1) link, while a graphics adapter typically uses a much wider and faster 16-lane link.

In the embodiment, PCIe communication system 100 is typical of a personal computer system, but could be some other type of data processing system, such as a server, a workstation, or an embedded system. As used herein, a "data processing system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, a data processing system may be a server, a personal computer, a network storage device, or any other suitable device.

Further, the data processing system may include random access memory (RAM), one or more processing resources such as a CPU, hardware or software control logic, ROM, and/or other types of nonvolatile memory. Additional components of the data processing system may include one or more disk drives, one or more network ports for communicating with external devices, as well as various input and output (I/O) devices, such as a keyboard, a mouse, and a video display. The information handling system may also include one or more buses operable to transmit communications between the various hardware components.

Figure 2:
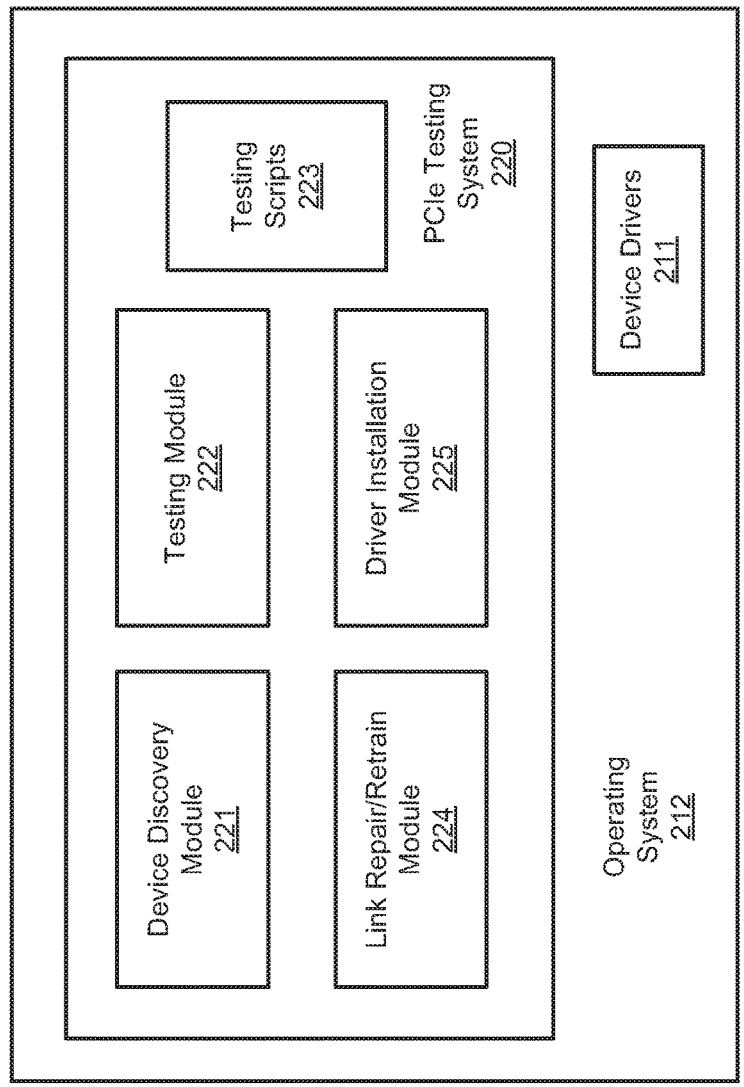
FIG. 2 is a block diagram illustrating an example of a system for testing PCIe devices according to one embodiment of the invention.

Referring back to FIG. 1, CPU 101 may be any central processing device, such as a processor as described in FIG. 2. CPU 101 may be programmed to at least execute an operating system (e.g., operating system 212 of FIG. 2) having basic input/output system (BIOS) programming. In one embodiment, root complex 102 is located at the uppermost layer of the tree structure of a PCIe communication system and is respectively connected through a system bus (also referred to as a front side bus) with CPU 101 and through a memory bus with memory 103. In one embodiment, memory 103 may represent or may be included as a memory device as described in FIG. 2.

In one embodiment, in communication between root complex 102 and PCIe endpoint device 111, switch 104 may be a transaction layer packet (TLP) relay device. As used herein, a "switch" may refer to a logical assembly of multiple virtual PCIe bridge devices (i.e., logical PCIe-to-PCIe bridges), such as a network switch that controls multiple point-to-point serial connections by using packet switching to receive, process, and forward data to each endpoint device (e.g., PCIe endpoint devices 111-114). For example, switch 104 may be configured to provide a fan-out from root complex 102 to links 121*a-c*, and also provide link scaling.

As used herein, "link scaling" means that the available bandwidth of PCIe bus 121 is allocated, such that a predetermined number of links 121*a-c*, each having a size conforming to PCIe architecture standards, are physically routed to PCIe endpoint devices 111-113. Each link 121*a-c* comprises one or more lanes. A link having a single lane (also referred to as having a ×1 width) has two low-voltage differential pairs, and is a dual simplex serial connection between two PCIe devices. Data transmission between the two PCIe devices is simultaneous in both directions. Scalable performance is achieved through wider link widths (×1, ×2, ×4, ×8, ×16, ×32). Links are scaled symmetrically, with the same number of lanes in each direction.

According to some embodiments, PCIe bus 121 includes one or more link 121*a-c*, by means of which PCIe endpoint devices 111-113 are connected. In one embodiment, depending on system 100, PCIe endpoint device 114 is connected to root complex 102 via PCIe bus 120*c* (without having to use switch 104). For example, if system 100 is a desktop computer, PCIe endpoint device 114 may be a graphics adapter, a hard disk drive (HDD) (via a serial ATA link), and local 110 (via a USB link). For a server, PCIe endpoint device 114 may be a gigabit Ethernet (GbE) and/or an additional bridge device.

Further, in one embodiment, PCIe endpoint devices 111-114 may be peripheral devices or chips, physically connected using PCIe card slots or other connection mechanisms. For example, PCIe endpoint devices 111-114 may include, but are not limited to, mobile docking adapters, Ethernet adapters, other add-in devices, gigabit Ethernet connections, additional switching capability for IO and cluster interconnections, and/or line cards. Note that a PCIe endpoint device may represent a PCIe device as described in FIG. 2.

The physical layer includes all circuitry for interface operation, including driver and input buffers, parallel-to-serial and serial-to-parallel conversion, PLL(s), and impedance matching circuitry. The physical layer also includes logical functions related to interface initialization and maintenance. The physical layer exchanges information with the DLL in an implementation-specific format. The physical layer is responsible for converting information received from the DLL into an appropriate serialized format and transmitting it across the PCIe link at a frequency and width compatible with the device connected to the other side of the link. Note that PCIe communication system 100 may include one or more components and have one or more different configurations.

FIG. 2 is a block diagram illustrating an example of a system configuration for testing PCIe devices according to one embodiment of the invention. In one embodiment, system 200 includes, but is not limited to, operating system 212. Further, according to one embodiment, system 200 includes operating system 212 and a memory (not shown) (e.g., memory 103 of FIG. 1) communicatively coupled to one or more PCIe devices (not shown)(e.g., PCIe endpoint devices 111-114) and a processor (not shown)(e.g., CPU 101 of FIG. 1) via a bus or an interconnect. In one embodiment, system 200 may represent a data processing system performing any of the processes or methods described herein. System 200 may be implemented as integrated circuits (ICs), portions thereof, discrete electronic devices, or other modules adapted to a PCB such as a motherboard or add-in card of a computer system, or as components otherwise incorporated within a chassis of the computer system.

According to one embodiment, a processor (not shown) may represent a single processor or multiple processors with a single processor core or multiple processor cores included therein. The processor may represent one or more general-purpose processors such as a microprocessor, a CPU, or the like. More particularly, the processor may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processor may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

In one embodiment, the processor, which may be a low power multi-core processor socket such as an ultra-low voltage processor, may act as a main processing unit and central hub for communication with the various components of the system. Such processor can be implemented as a system on chip (SoC). The processor is configured to execute instructions for performing the operations and steps discussed herein.

According to some embodiments, system 200 may include one or more PCIe devices (also referred to as PCIe endpoint devices)(not shown), which may be one or more peripheral devices or chips, physically connected using card slots (e.g., PCIe slots) or other connection mechanisms. As used herein, a "PCIe endpoint device" refers to a PCIe device that terminates a PCIe link. The PCIe endpoint device has one connection to a PCIe tree topology—but it can have a connection to another kind of bus. For example, a PCIe endpoint device may be a PCIe network card, a PCIe storage controller, etc. PCIe endpoint devices can also act as a bridge to a legacy/compatibility bus, such as a PCIe-to-PCI bridge, or a bridge to a low pin count (LPC) bus, etc.

Further, the one or more PCIe devices may be connected to a memory (not shown) via a PCIe bus (also referred to as an interconnect), which may include a switch and/or a link (as described in FIG. 1). The particular type of PCIe device (e.g., a device holder, an IO module, or an adapter) may depend on the type of application of system 200. For example, for a desktop computer system, examples of typical PCIe devices are mobile docking adapters, Ethernet dapters, and/or other add-in devices. For example, for a saver platform system, PCIe devices may include one or more gigabit Ethernet connections, and additional switching capability for IO and cluster interconnections. For example, for a communications platform system, PCIe device may include one or more line cards.

In one embodiment, the one or more PCIe devices may include hot-swap protection devices that are implemented on a PCB to limit an in-rush current to a load when a PCIe card (not shown) is inserted into a live (power-on) PCIe slot of the PCIe device. For example, this hot-plug configuration ensures that when a PCIe card is hot-plugged that no current and voltage are generated from the hot-plug event. The hot-plug hardware does not require compliance to the PCI hot-plug specification, including Attention LED, Attention button, Power LED, etc. The one or more PCIe devices may be utilized to host one or more PCIe plugin cards. The one or more PCIe devices may be hot plugged through matching mating connectors between the one or more PCIe devices and operating system 212, which may be located in the memory. For example, a circuit board may be utilized to convert the signals between the PCIe plug-in card of the one or more PCIe devices and the cable connectors of system 200. Note that throughout this application a PCIe device is utilized as an example of an IO card (e.g., a PCIe card) or a peripheral device. However, the one or more PCIe devices may also be applicable to other types of IO or peripheral devices, such as PCI devices, PCI-X devices, universal serial bus (USB) devices, and so on.

In one embodiment, the memory includes, but is not limited to, operating system 212. According to one embodiment, operating system 212 includes, but is not limited to, device drivers 211 and PCIe testing system 220 loaded therein. The memory may include one or more volatile storage (or memory) devices such as random access memory (RAM), dynamic RAM (DRAM), synchronous DRAM (SDRAM), static RAM (SRAM), or other types of storage devices. The memory may store information including sequences of instructions that are executed by the processor (e.g., CPU 101 of FIG. 1), or any other device. For example, executable code and/or data from at least one of operating system 212, device drivers 211, firmware (e.g., input output basic system or BIOS), and/or applications can be loaded in the memory and executed by the processor.

In one embodiment, operating system 212 may be a system software that manages the resources allocated to the memory. For example, operating system 212 may include one or more utility tools configured to discover one or more PCIe device PCIe devices 111-114 of FIG. 1) and their respective root complexes, and to access Me configuration space headers in order to read the statuses of the discovered PCIe devices and modify the states of the discovered PCIe devices. Further, operating system 212 performs basic tasks such as, for example, controlling and allocating virtual memory, prioritizing the processing of instructions, controlling virtualized input and output devices (e.g., PCIe devices), facilitating networking, managing a virtualized file system, etc. Operating system 212 can be any kind of operating systems, such as, for example, Windows® operating system from Microsoft®, Mac OS®/iOS® from Apple, Android® from Google®, Linux®, Unix®, or other real-time or embedded operating systems such as VxWorks.

According to one embodiment, operating system 212 utilizes one or more device drivers 211 to interact with the one or more PCIe devices. Device drivers 211 may be a computer software that provides interaction with a hardware device (e.g., PCIe devices 111-114 of FIG. 1) to an OS (e.g., operating system 212) or other application software. For example, due to the specialized role of a device driver, device drivers are often hardware-dependent and operating system-dependent, which may be running with a kernel of the operating system.

In one embodiment, PCI testing system 220 includes, but is not limited to, device discovery module 221, testing module 222, testing scripts 223, link repair/retrain module 224, and driver installation module 225. Modules 221-222 and 224-225 may be implemented in software, hardware, or a combination thereof. In one embodiment, device discovery module 221 may be utilized to detect the one or more PCIe devices that have been inserted/reinserted into one or more PCIe buses (not shown) of system 200. As used herein, a "discovered PCIe device" refers a PCIe device that has been detected as being inserted/reinserted into a PCIe bus. For example, device discovery module 221 may be configured to discover one or more PCIe cards when they are hot-plugged to one or more PCIe buses/slots of the one or more PCIe devices. In one embodiment, device discovery module 221 may also be utilized to scan/rescan the one or more PCIe buses of system 200 to discover one or more new PCIe devices after they have been unplugged and reinserted into the one or PCIe buses.

In one embodiment, link repair/retrain module 224 may be utilized to retrain and/or recover a PCIe link associated with a PCIe device, which may have been re-inserted into a PCIe bus, and a root complex of the PCIe device. For example, for each of the PCIe devices discovered by device discovery module 221, link repair/retrain module 224 may repair and retrain a PCIe link associated with the PCIe device, without rebooting system 200. Note that repairing errors/states and retraining PCIe links are described in further detail in FIG. 7.

In one embodiment, for each PCIe device discovered by device discovery module 221, driver installations module 225 may be used to load a device driver instance for the discovered PCIe device to be hosted by operating system 212. To load a device driver instance, driver installation module 225 may assign a logical device identifier (ID) representing the discovered PCIe device to the device driver instance, where the logical device ID is constructed based on a combination of one or more of a bus number, a device number, and/or a function number of the PCIe device. According to one embodiment, driver installation module 225 may utilize the logical device ID to identify an individual physical PCIe slot in which the PCIe device is inserted, such that multiple PCIe devices can be concurrently identified and tested without rebooting system 200.

According to one embodiment, testing module 222 may be utilized to execute a test routine (e.g., testing scripts 223) to concurrently test the one or more PCIe devices via their respective device driver instances installed by driver installation module 225. Further, testing module 222 may send a signal, which indicates that the execution of the test routine has been completed, to driver installation module 225, such that the device driver instances of the PCIe devices may be unloaded. In one embodiment, testing module 222 may notify operating system 212 to remove the PCIe devices from a namespace of operating system 212, without rebooting system 200. Further, when a test is completed, test module 222 may be configured to display a message via a user interface (not shown) of system 200 to prompt a user (e.g., a tester) that the one or more PCIe devices can be physically removed from the corresponding PCIe slots.

As such, one of the advantages of system 200 is that it can automatically recognize and test multiple PCIe devices concurrently without rebooting the server, i.e., having to power off the server, unplug a single tested PCIe device, plug a new single PCIe device, power on the server, reboot the OS, and so on. Accordingly, this advantage provides a method for concurrently testing multiple PCIe devices and thus highly reduces the testing time of multiple (N) PCIe cards by N times during a production flow, where the testing time directly contributes to the total cost of the system being deployed.

Note that system 200 is intended to show a high level view of many components of a server or computer system. However, it is to be understood that additional components may be present in certain implementations and furthermore, different arrangement of the components shown may occur in other implementations.

Figure 3:
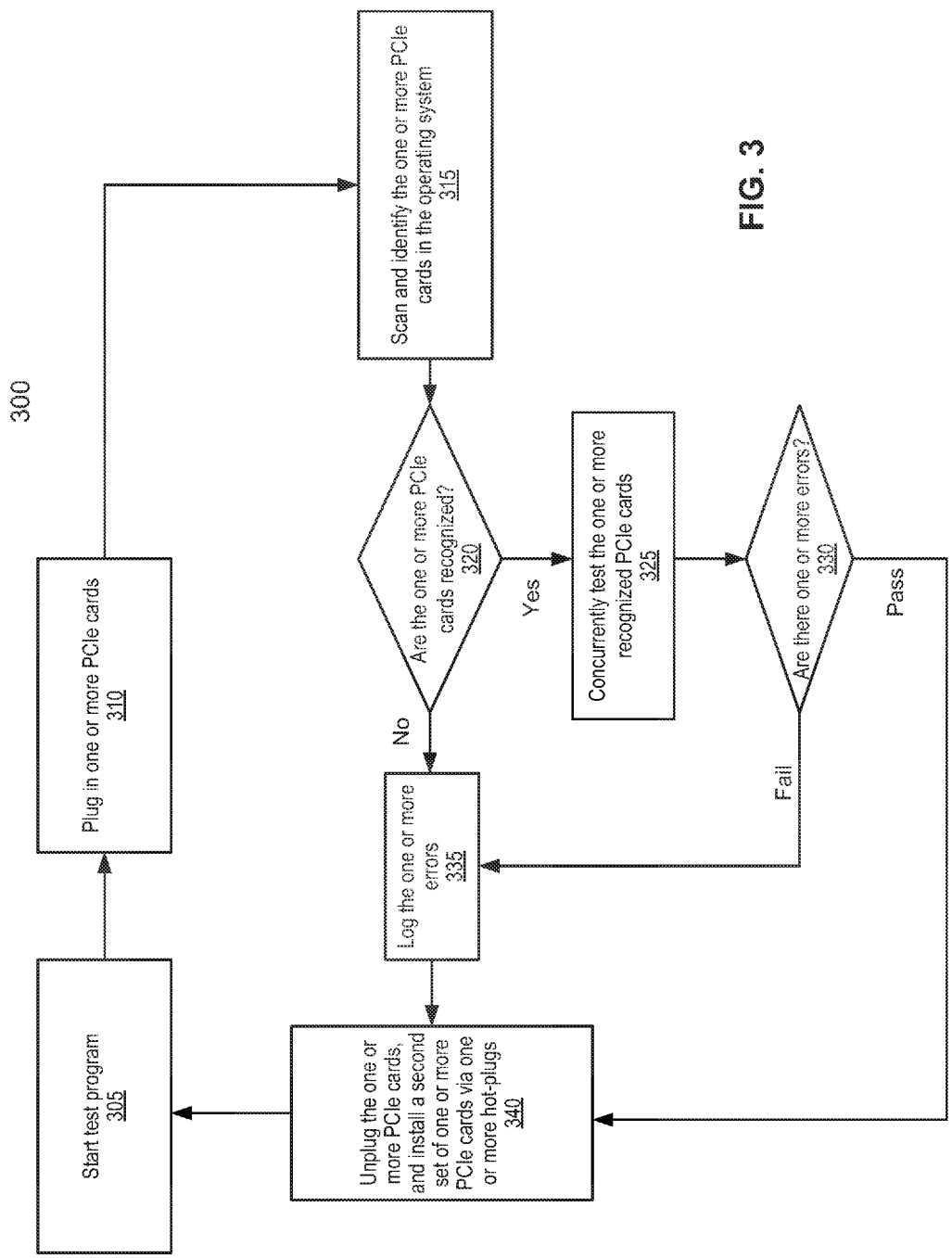
FIG. 3 is a processing flow for testing PCIe devices according to one embodiment of the invention.

FIG. 3 is a processing flow for testing PCIe devices according to one embodiment of the invention. Process flow 300 may be performed by system 200 of FIG. 2. Further, process flow 300 can also be performed by processing logic which may be implemented in software, firmware, hardware, or any combination thereof. Referring now to FIG. 3, processing logic starts a test program at block 305. The test program may include one or more testing operations (also referred to as a test routine) to concurrently test multiple PCI devices via the respective device driver instances. At block 310, one or more PCIe cards are inserted in a data processing system.

In one embodiment, at block 315, processing logic scans and identifies the one or more PCIe cards plugged in the operating system. For example, processing logic may detect the one or more PCIe cards that have been inserted into the one or more PCIe buses of the data processing system, scan all the PCIe buses of the data processing system to discover the one or more PCIe cards in response to the detection, and then load one or more device driver instances for the one or more discovered PCIe devices hosted by the operating system. At block 320, processing logic determines whether the one or more PCIe cards are recognized. For example, the processing logic may determine whether each PCIe card is uniquely distinguished and registered in the operating system. If the processing logic recognized the one or more PCIe cards, processing logic concurrently tests the one or more recognized PCIe cards at block 325. If the processing logic did not recognize the one or more PCIe cards, processing logic logs the one or more errors at block 335.

At block 330, processing logic determines whether there are one or more errors from concurrently testing the one or more recognized PCIe cards. If processing logic determines that there were one or more errors (i.e., the concurrent testing failed), processing logic logs the one or more errors at block 335. If processing logic determines that there were no errors (i.e., the concurrent testing passed), processing logic proceeds to block 340. For example, in response to a signal indicating that the execution of the test program has been completed, processing logic unloads the device driver instances of the PCIe cards, and communicated with the operating system to remove the PCIe cards from a namespace of the operating system, without rebooting the data processing system.

Further, at block 340, the one or more PCIe cards are unplugged and a second set of one or more PCIe cards are inserted via one or more hot-plugs, after the concurrent testing of the first set of PCIe cards passed at block 330 and/or after the one or more errors were logged at block 335. For example, processing logic may display a message to prompt the operator that the PCIe cards can be physically removed from the corresponding PCIe slots in order to install and test the second set of PCIe cards. Also, note that a link repair/retrain module may, for example, repair the one or more logged errors at block 335, such as repairing any necessary PCIe configuration settings and rendering the PCIe configuration settings usable in the operating system.

Figure 4:
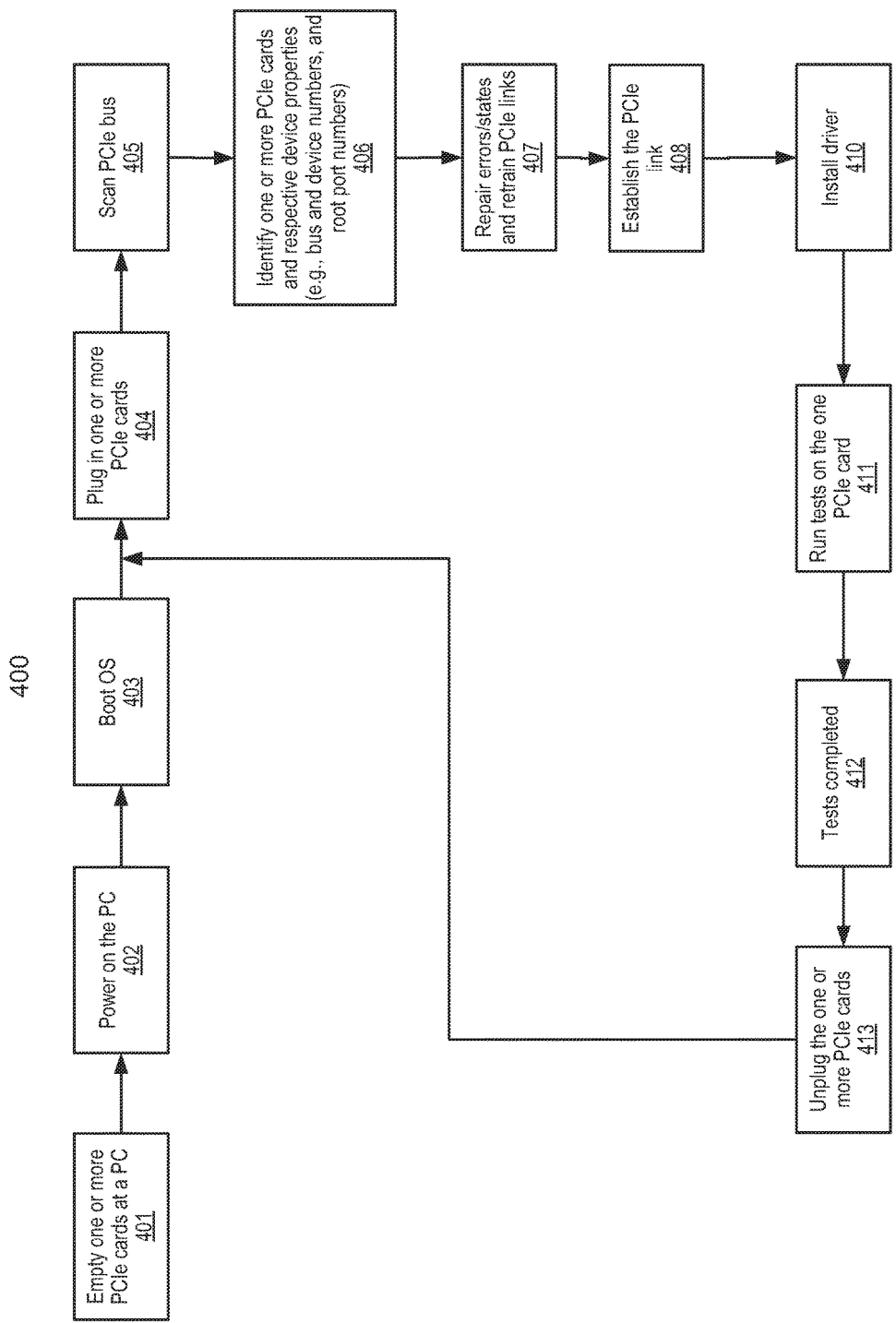
FIG. 4 is a detailed processing flow for testing PCIe devices according to one embodiment of the invention.

FIG. 4 is a processing flow for testing PCIe devices according to another embodiment of the invention. Process flow 400 may be performed by system 200 of FIG. 2 to concurrently test multiple PCIe cards in a PC, without powering off and rebooting the PC. Further, process flow 400 can also be performed by processing logic which may be implemented in software, firmware, hardware, or any combination thereof. Referring now to FIG. 4, the operator empties one or more PCIe cards from one or more PCIe buses of the PC (e.g., a server) at block 401. Based on the one or more PCIe cards being emptied at the PC, the operator powers on the PC at block 402 and boots an operating system 403 of the PC. At block 404, one or more PCIe cards are inserted to the one or more PCIe buses of the PC for testing.

In one embodiment, for example, processing logic scans the one or more PCIe buses of the PC at block 405. Further, at block 406, processing logic identifies the one or more PCIe cards and the respective PCIe device properties (e.g., bus and device numbers of the PCIe cards and the respective root complexes). For example, for each PCIe slot, processing logic may identify a bus number of the PCIe device, a device number of the PCIe device, a bus number of the root complex of the PCIe bridge for the PCIe device, and a device number of the root complex of the PCIe bridge for the PCIe device.

At block 407, processing logic repairs one or more errors/states and retrains one or more PCIe links associated with the one or more PCIe cards, without rebooting the PC. For example, processing logic may access a PCIe configuration space in order to read a status of the PCIe device and modify an error/state of the PCIe device (as described in further detail in FIG. 7). At block 408, processing logic establishes the one or more PCIe links associated with the one or more PCIe cards. Further, at block 410, processing logic installs/loads one or more device driver instances for the one or more PCIe cards to be hosted by the operating system. For example, to install a device driver instance, processing logic may assign a logical device identifier (ID) representing the PCIe card to the device driver instance, where the logical device ID is constructed based on a combination of one or more of a bus number, a device number, or a function number of the PCIe card. The logical device ID is utilized by the device driver instance to identify a physical PCIe slot in which the PCIe card is inserted, such that the one or more PCIe cards can be concurrently identified and tested at block 411.

At block 411, the one or more PCIe cards are tested. For example, a test routine is executed to concurrently test the one or more PCIe cards via the one or more respective device driver instances. Based on the tests being completed 412, the one or more PCIe cards are unplugged at block 413. As a result, a second set of one or more PCIe cards may be installed to be tested via one or more hot-plugs, without having to power off the PC and reboot the PC, and thus proceeds back to block 404 to plug in and test the second set of PCIe cards.

Figures 5A, 5B:
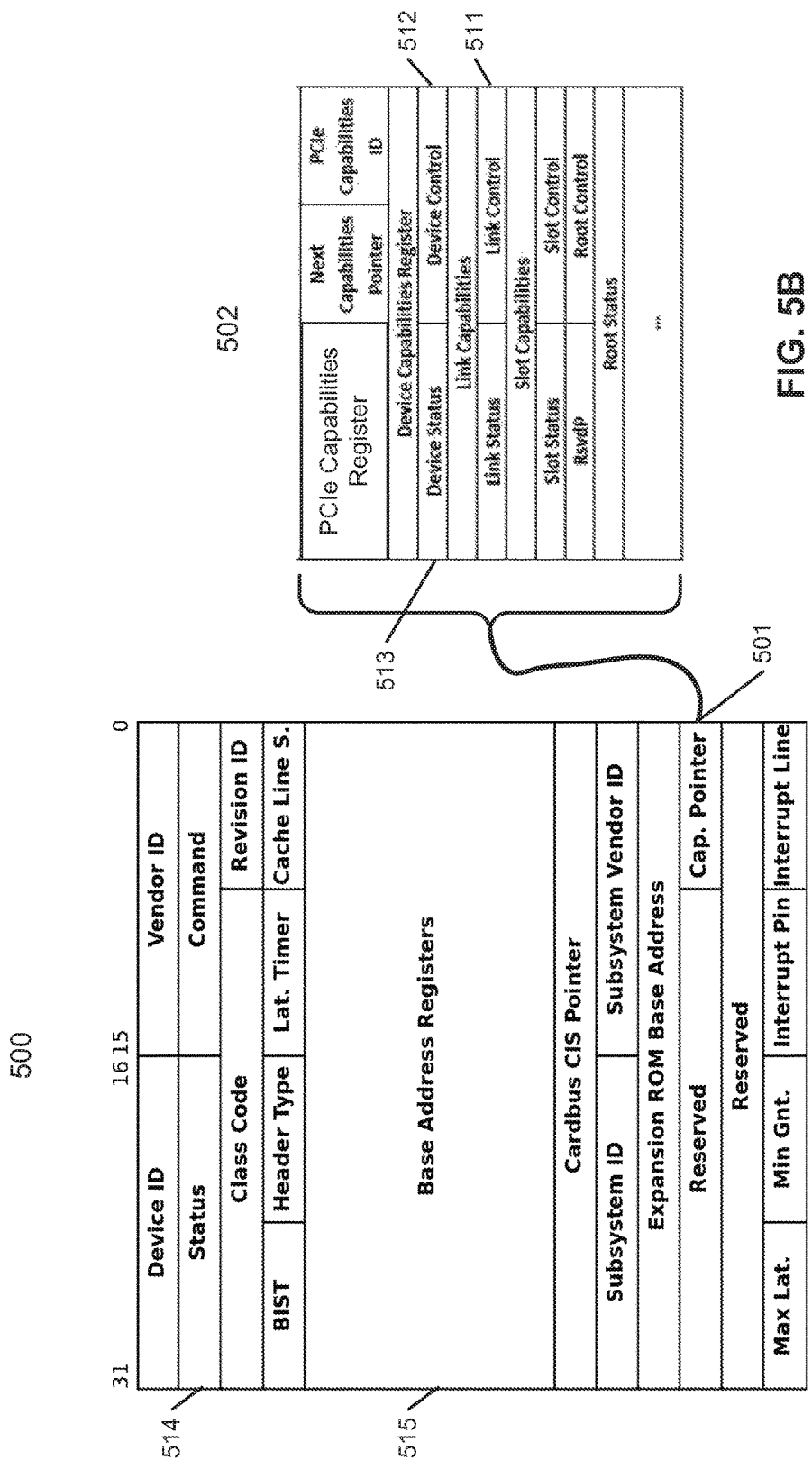
FIGS. 5A-B are block diagram illustrating examples of one or more registers of PCI configuration space headers according to one embodiment of the invention.

FIGS. 5A-B are block diagram illustrating examples of one or more registers of PCI configuration space headers according to one embodiment of the invention. Referring now to FIG. 5A. FIG. 5A illustrates one or more common register fields of PCIe configuration space header 500. These registers are defined for both Type 0 and Type 1 configuration space headers. As used herein, a "PCIe configuration space" refers to a PCIe method for performing an auto configuration of a PCIe card when it is inserted into a PCIe slot/bus. Further, for example, PCIe configuration space header 500 includes a device ID register, a vendor ID register, a status register 514, a command register, a base address registers 515, an 8-bit capabilities pointer register 501, and so on. The device ID register identifies a unique ID to describe the PCIe device itself. The vendor ID register identifies a unique ID to describe the originator of the PCIe device. Further, the Device ID (DID) and Vendor ID (VID) registers are both used to identify the PCIe device, and are commonly called the PCIe ID (or PCI ID). For example, the 16-bit vendor ID is allocated by the PCI-SIG, and the 16-bit device ID is then assigned by the vendor.

PCIe configuration space header 500 includes a set of numbers on the top of the header table (e.g., 0, 15, 16, and 31) that mark the bit position in the registers of PCIe configuration space header 500. Further, PCIe configuration space header 500 includes a set of numbers on the right of header table (e.g., 00h-3Ch) (not shown) that mark the byte offset of the registers in PCI configuration space header 500. For example, to address a PCIe device, it must be enabled by being mapped into the system's IO port address space or memory-mapped address space. For example, the system's firmware, device drivers, or the OS (e.g., OS 212 of FIG. 2) program the Base Address Registers (BARs) (e.g., base address registers 515) to identify the address mapping of a PCIe device by writing configuration commands to a PCIe card. As such, in reference to FIG. 2, processing logic of PCIe testing system 200 may, for example, be used to discover one or more PCIe devices under test (DUT) and the root complexes of the respective PCIe devices to identify a physical PCIe slot in which a PCIe device is inserted/reinserted, such that the one or more PCIe devices may be concurrently identified and tested. Note that each PCIe device includes capabilities pointer register 501, since the way to extend the configuration space of a PCIe device (as compared to a PCI device) is via capabilities pointer register 501.

Referring now to FIG. 5B. FIG. 5B illustrates capabilities pointer register 501 located in PCIe device configuration space header 500 pointing to PCIe configuration space extension 502 (also referred to a PCI capabilities register set). According to some embodiments, PCIe configuration space extension 502 generally includes, but is not limited to, a PCIe capabilities register, a next capabilities pointer, a PCIe capabilities ID, a device capabilities register, a device status 513, a device control 512, a link capabilities, a link status, a link control 511, a slot capabilities, a slot status, a slot control, a rsvdP, a root control, a root status, etc. For example, when PCI capabilities register set 502 is enabled, it is tied together by a linked list (as illustrated in FIGS. 5A-B) that starts with an 8-bit capabilities pointer 501 at address 34h in PCIe device configuration space header 500. Note that each capability structure set also has a unique capability ID.

In one embodiment, capabilities pointer register 501 points to the start of PCIe capabilities register set 502 by using an 8-bit offset (in bytes) at the start of PCIe capabilities register set 502. The offset is calculated from the start of the PCIe device configuration space. This 8-bit offset is stored in capabilities pointer register 501. The position of PCIe capabilities register set 502 is device-specific. However, PCIe capabilities register set 502 is placed in the first 256 bytes of the PCIe device configuration space 500 and located after the mandatory PCI header. As such, continuing with the above example in reference to FIG. 2, the processing logic of PCIe testing system 200 may also be used to access multiple PCIe configuration space headers (e.g., PCIe capabilities register set 502 and PCIe configuration space header 500) in order to read the statuses of the PCIe and root complex devices, modify the states of the PCIe and root complex devices, and/or clear any errors of the PCIe and root complex devices.

Figure 6:
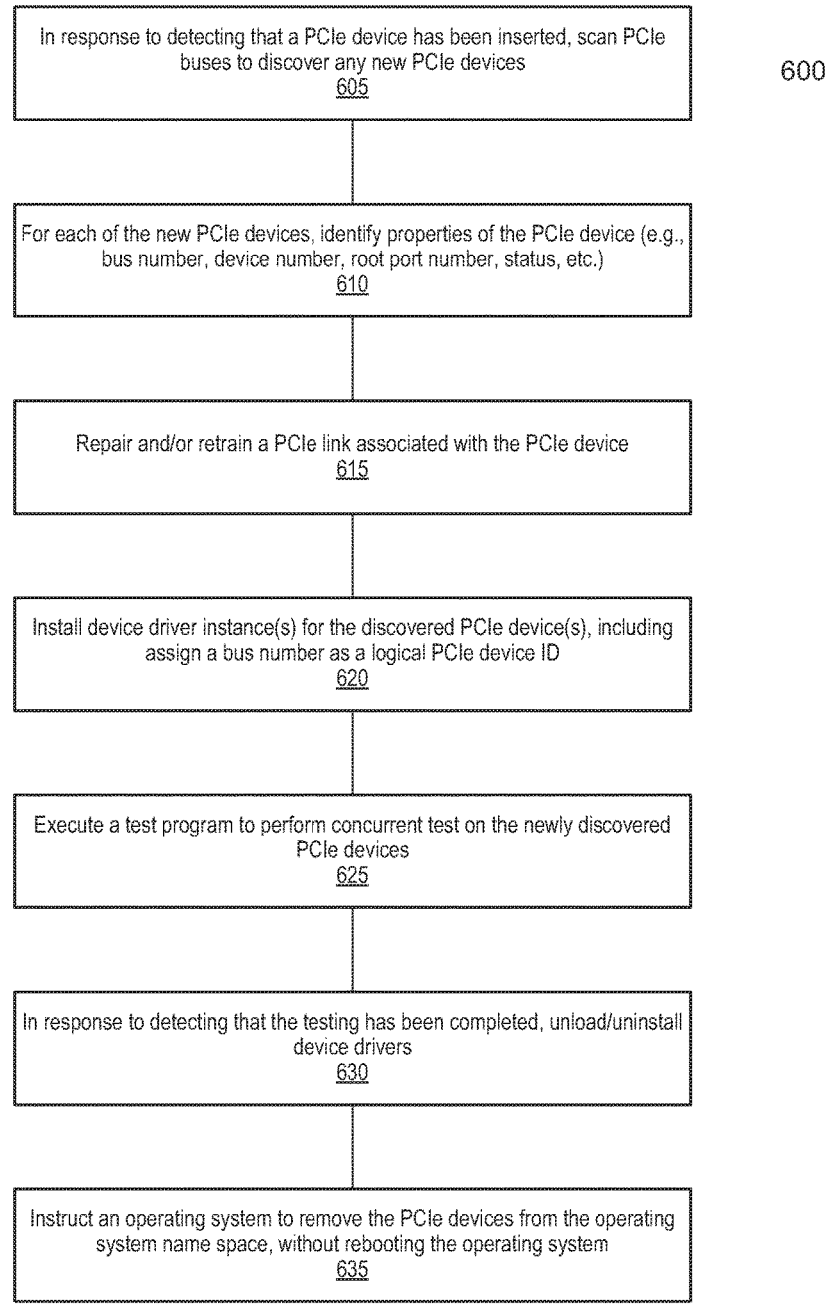
FIG. 6 is a flow diagram illustrating a method for testing PCIe devices according to one embodiment of the invention.

FIG. 6 is a flow diagram illustrating a method for testing PCIe devices according to one embodiment of the invention. For example, method 600 can be performed by a PCIe testing system (e.g., PCIe testing system 220 of FIG. 2). Further, method 600 can also be performed by processing logic which may be implemented in software, firmware, hardware, or any combination thereof. Referring now to FIG. 6 according to one embodiment, at block 605, in response to detecting that a PCIe device has been inserted into a data processing system, processing logic scans PCIe buses to discover any PCIe devices. For example, a PCIe testing system may scan/rescan one or more PCIe buses to discovery if any PCIe devices have been inserted/reinserted into one of the PCIe slots of the PCIe system. At block 610, for each of the new PCIe devices that are discovered, processing logic identifies properties of the PCIe device, such as a combination of one or more of a bus number, a device number, a root complex number, a function number, a status, etc. of the PCIe device.

At block 615, processing logic repairs and/or retrains a PCIe link associated with the PCIe device. For example, for each of the PCIe devices discovered, a PCIe testing system may retrain and recover a PCIe link between a PCIe device (e.g., PCIe endpoint device 111 of FIG. 1) and a root complex (e.g., root complex 102 of FIG. 1) of the respective PCIe device. At block 620, processing logic installs/loads one or more device driver instances for the one or more discovered PCIe devices to be hosted by an operating system, which includes assigning a combination of one or more of a bus number, a device number, or a function number as a logical PCIe device ID. At block 625, processing logic executes a test program to perform concurrent test on the newly discovered PCIe devices. At block 630, in response to detecting that the testing has been completed, processing logic unloads/uninstalls the one or more device driver instances. For example, once the tests are completed, processing logic terminates all data traffic from/to the PCIe device(s), then removes the respective PCIe device driver instance(s) using RMMOD commands.

At block 635, processing logic instructs an operating system to remove the PCIe devices from the operating system name space, without rebooting the operating system. For example, processing logic assumes that the PCIe device belongs to PCIe domain 0. Note that the processing logic operations of block 635 (i.e., the remove operation/command) and block 605 (i.e., the rescan operation/command) allows the OS's kernel to cycle-power the PCIe device, without rebooting the data processing system. Also note that processing logic may be used to display a message to prompt a user that the PCIe devices can be physically removed from the corresponding PCIe slots.

Figure 7:
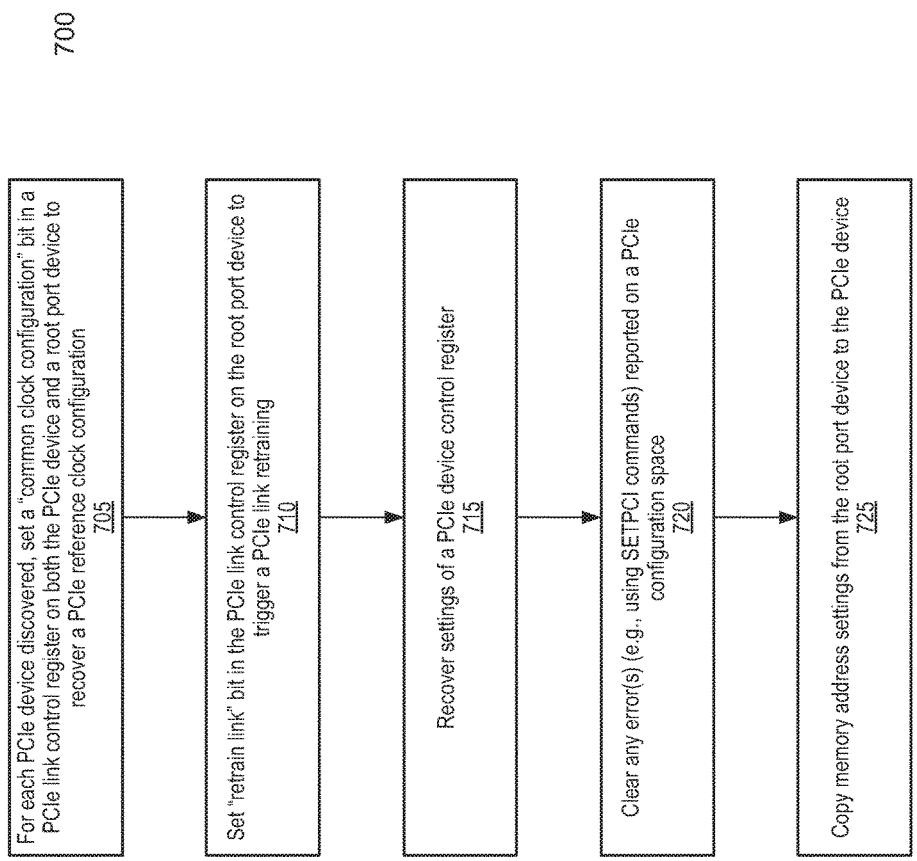
FIG. 7 is a flow diagram illustrating a method for repairing/retraining a PCIe link according to one embodiment of the invention.

FIG. 7 is a flow diagram illustrating a method for repairing/retraining a PCIe link according to one embodiment of the invention. In one embodiment, method 700 illustrates in further detail how a PCIe testing system repairs errors/states and retrains one or more PCIe link. For example, method 700 can be performed by a PCIe testing system (e.g., PCIe testing system 220 of FIG. 2). Further, method 700 can also be performed by processing logic which may be implemented in software, firmware, hardware, or any combination thereof.

Referring now to FIG. 7 according to one embodiment, at block 705, for each PCIe device discovered, processing logic sets a "common clock configuration" bit in a PCIe link control register (e.g., link control register 511 of FIG. 5B) on both the PCIe device and the respective root complex device, in order to recover a PCIe reference clock configuration. For example, the "common clock configuration" bit is lost after the PCIe device is removed and reinserted into a PCIe slot.

At block 710, processing logic sets a "retrain link" bit in the PCIe link control register on the root complex device to trigger a PCIe link retraining. For example, setting the "retrain link" bit is required after re-inserting a PCIe device into the PCIe slot. At block 715, processing logic recovers settings of a PCIe device control register (e.g., device control register 512 of FIG. 5B). For example, processing logic recovers a max read request size setting and a max payload size setting for the given application running on the PCIe device. Note that the settings are application specific. For example, prior to block 720, processing logic may reinstall a PCIe device driver instance in the OS for the respective PCIe device.

At block 720, processing logic clears any one or more errors/states (e.g., using SETPCI commands) reported on a PCIe configuration space (e.g., status registers 513-514 as illustrated in FIGS. 5A-B). At block 725, processing logic copies memory address settings from the root complex device to the PCIe device (e.g., uplink PCIe device or parent PCIe device). For example, for each of the PCIe devices discovered, processing logic modifies the memory address settings in the PCIe device configuration space to match its respective root complex device. Further, processing logic may use read-modify-write techniques to clear any error bits set in an uncorrectable error status register (e.g., status register 514 of FIG. 5B) on the root complex device. Processing logic may also use read-modify-write techniques to clear any error bits set in a device error status register (e.g., device status register 513 of FIG. 5B) on the root complex device. Continuing with the above example, processing logic may read a base address register (BAR) recorded in the root complex device for the previous PCIe device to be removed, then write it back to the BAR of a new PCIe device to recover its BAR setting (e.g., BAR 515 of FIG. 5A). Note that the exact BAR entries in the root complex devices and PCIe devices that need to be discovered can be discovered using a LSPCI commands. Also note that after block 725, processing logic may execute a test routine to concurrently test the one or more discovered PCIe devices via respective device driver instances.

As described above, repairing error/states and retraining PCIe links can be accomplished using one or more embodiments. In another embodiment, processing logic may set a Bus number (B) and a Device number (D) of a PCI Express (PCIe) End-Point device (EP) and its associate closet Root Port (RP) (also referred to as root complex). Each End-Point device is plugged into a particular physical PCIe slot (S) on the PC motherboard, which has a fixed B and D numbers for a given PC system.

As such, processing logic may set these parameter for a given slot (S):

EP_B[S]: The Bus number of the End-Point device;
EP_D[S]: The Device number of the End-Point device;
RP_B[S]: The Bus number of the Root Port of the PCIe bridge for the End-Point device;
RP_D[S]: The Device number of the Root Port of the PCIe bridge for the End-Point device.

Further, processing logic can use a lspci utility tool in a Linux OS to discover the End-Point device under the test and its associate Root Complex. Processing logic can also use a setpci utility tool in the Linux OS to access a PCIe configuration space in order to read device status and modify device states.

For example, according to this embodiment, processing logic may execute the following steps to repair errors/states and retrain PCIe links. At step 1: processing logic insert/re-inserts PCIe End-Point Device(s) into PCIe Slots in a PC system. At step 2, processing logic issues a Linux system command to scan/rescan PCIe bus to discover if any End-point devices are inserted (re-inserted) into PCIe slots in the PC system, for example, echo "1">/sys/bus/pci/rescan.

At step 3, processing logic retrains and recovers the PCIe link between an End-point device (re-inserted into a lot) and its Root Port, iterating through all End-point devices discovered in the PC system, for example,

```
for (S = s_start; S <= s_end; S = S + 1)
{ma
    # Set the "Common Clock Configuration" bit in the PCIe Link Control
    Register (offset 10h) on both End-Point and Root Port devices, to recover the
    common PCIe reference clock configuration in the PC system. This bit is lost
    after an End-point device is removed and reinserted into a PCIe slot.
    setpci -s EP_B[S]:EP_D[S].0 CAP_EXP+10.w =0040
    setpci -s RP_B[S]:RP_D[S].0 CAP_EXP+10.w =0040
    # Set the "Retrain Link" bit in the PCIe Link Control Register on the Root Port
    device to trigger the PCIe Link to retrain. This is required after re-inserting an
    End-point device into the slot
    setpci -s RP_B[S]:RP_D[S].0 CAP_EXP+10.w =0060
    # Recover the settings in the PCIe Device Control Register (offset 08h). For
    example, Max Read Request Size and Max Payload Size settings for the given
    application running on the End-point device. The exact setting is application
    specific.
    setpci -s EP_B[S]:EP_D[S].0 CAP_EXP+8.w = xxxx
}
```

Further, at step 4: processing logic may use a Linux OS command insmod to reinstall PCIe device driver in the Linux OS for the End-point device(s), for example, insmod MyPCIeDeviceDriver.ko.

Further, at step 5, processing logic may use a Linux OS command setpci to clear any errors reported in the PCIe configuration space; also modify settings in the End-Point device configuration space to match its Root Port, iterating through all End-Point devices discovered in the PC system. For example,

```
for (S = s_start; S <= s_end; S = S + 1)
{
    # Use Read-Modify-Write technique to clear any error bits set in the Uncorrectable
    Error Status Register (offset 04h) on the Root Port devices.
    VVVV = setpci -s RP_B[S]:RP_D[S].0 ECAP_AER+4.w
    setpci -s RP_B[S]:RP_D[S].0 ECAP_AER+4.w = VVVV
    # Use Read-Modify-Write technique to clear any error bits set in the Device Error
    Status Register (offset 0Ah) on the Root Port devices.
    VVVV = setpci -s RP_B[S]:RP_D[S].0 CAP_EXP+a.w
    setpci -s RP_B[S]:RP_D[S].0 CAP_EXP+a.w = VVVV
    # Read the Base Address Register (BAR) recorded in the Root Port for the previous
    End-Point device being removed, then write it back to the Base Address Register of
    the End-Point device to recover its BAR setting. Note that the exact BAR entry in the
    Root Port and End-point devices that need to be can be discovered using the lspci
    utility tool. In this example, we assume it is 20h for the Root Port and 12h for the End-
    Point device.
    VVVV = setpci -s RP_[B[S]:RP_D[S].0 20.w
    setpci -s EP_B[S]:EP_D[S].0 12.w = VVVV
}
```

At step 6: the End-Point PCIe device(s) are now ready for test. Processing logic may conduct test procedure on these devices. At step 7: Once tests are complete, processing logic may terminate all data traffic from/to the End-Point PCIe device(s), then remove PCIe device driver using the rmmod Linux command, for example, rmmod MyPCIeDevice.

At step 8: processing logic may issue a Linux system command to remove PCIe End-Point device from the PCIe bus. Note that this code assumes the End-Point device belongs to PCIe domain 0. The command remove in step 8 and command rescan in step 2 will allow the Linux OS kernel to cycle-power the PCIe device without a reboot. For example,

```
for (S = s_start; S <= s_end; S = S + 1)
{
    echo "1" > /sys/bus/pci/devices/0000\:EP_B[S]\:EP_D[S].0/
    remove
}
Sleep 3 # wait for 3 seconds
```

At step 9: PCIe End-Point device(s) may be removed from PCIe slots. As such, according to this embodiment, processing logic may repeat starting at step 1 for a second set of PCIe devices.

Figure 8:
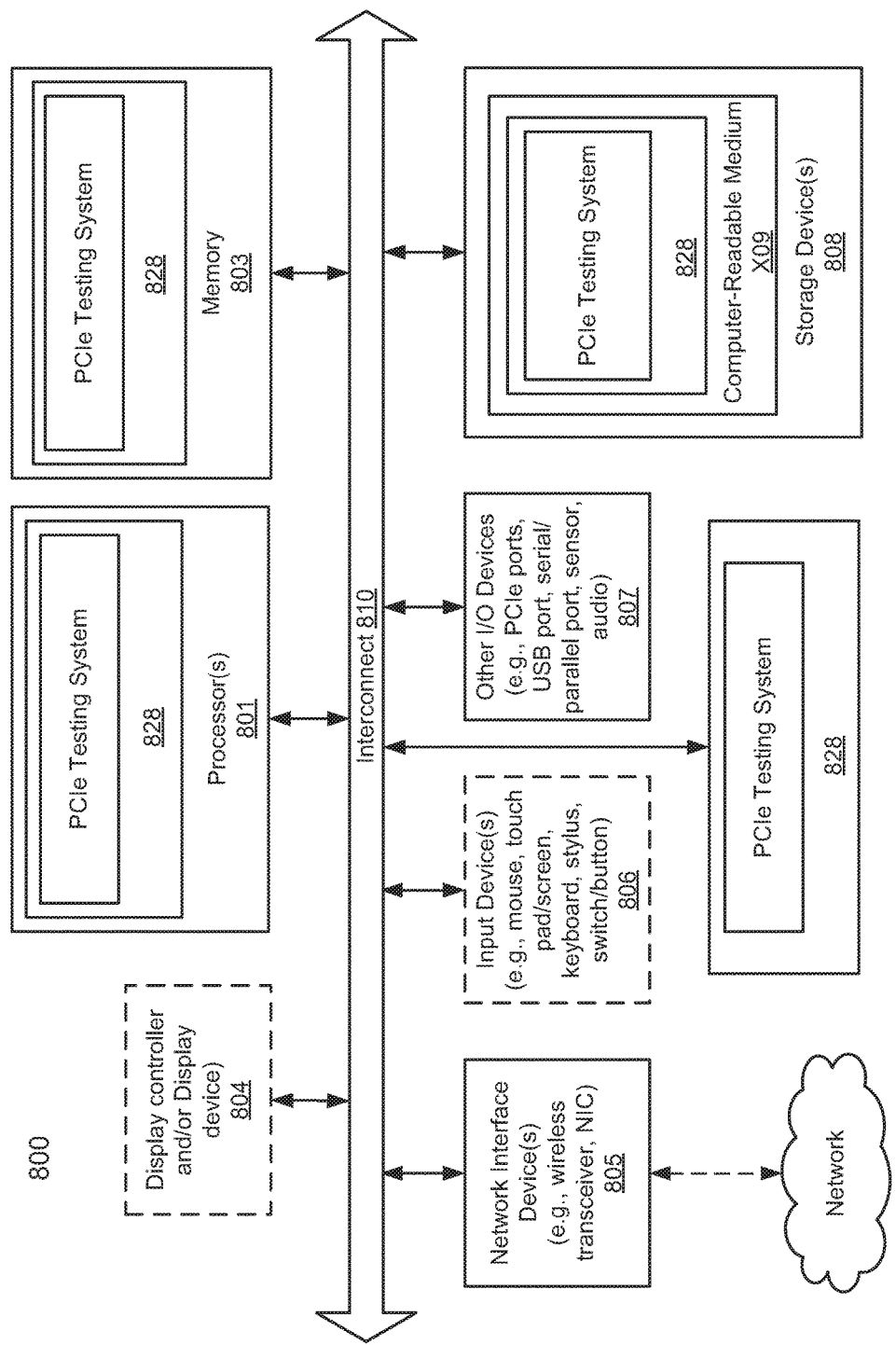
FIG. 8 is a block diagram illustrating a data processing system according to one embodiment.

FIG. 8 is a block diagram illustrating a data processing system according to one embodiment which may be used with one embodiment of the invention. For example, system 800 may represent any of data processing systems described above performing any of the processes or methods described above. System 800 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 800 is intended to show a high level view of many components of the computer system. However, it is to be understood that additional components may be present in certain implementations and furthermore, different arrangement of the components shown may occur in other implementations. System 800 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 800 includes processor 801, memory 803, and devices 804-808 via a bus or an interconnect 810. Processor 801 may represent a single processor or multiple processors with a single processor core or multiple processor cores included therein. Processor 801 may represent one or more general-purpose processors such as a microprocessor, a central processing unit (CPU), or the like. More particularly, processor 801 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 801 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 801, which may be a low power multi-core processor socket such as an ultra-low voltage processor, may act as a main processing unit and central hub for communication with the various components of the system. Such processor can be implemented as a system on chip (SoC). Processor 801 is configured to execute instructions for performing the operations and steps discussed herein. System 800 may further include a graphics interface that communicates with optional graphics subsystem 804, which may include a display controller, a graphics processor, and/or a display device.

Processor 801 may communicate with memory 803, which in one embodiment can be implemented via multiple memory devices to provide for a given amount of system memory. Memory 803 may include one or more volatile storage (or memory) devices such as random access memory (RAM), dynamic RAM (DRAM), synchronous DRAM (SDRAM), static RAM (SRAM), or other types of storage devices. Memory 803 may store information including sequences of instructions that are executed by processor 801, or any other device. For example, executable code and/or data of a variety of operating systems, device drivers, firmware (e.g., input output basic system or BIOS), and/or applications can be loaded in memory 803 and executed by processor 801. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 800 may further include IO devices such as devices 804-808, including display device(s) 804, network interface device(s) 805, optional input device(s) 806, and other optional IO device(s) 807, and storage device(s) 808. Network interface device 805 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 806 may include a mouse, a touch pad, a touch sensitive screen (which may be integrated with display device 804), a pointer device such as a stylus, and/or a keyboard (e.g., physical keyboard or a virtual keyboard displayed as part of a touch sensitive screen). For example, input device 806 may include a touch screen controller coupled to a touch screen. The touch screen and touch screen controller can, for example, detect contact and movement or break thereof using any of one or more touch sensitivity technologies, including but not limited to capacitive, resistive, infrared, and surface acoustic wave technologies, as well as other proximity sensor arrays or other elements for determining one or more points of contact with the touch screen.

IO devices 807 may include an audio device. An audio device may include a speaker and/or a microphone to facilitate voice-enabled functions, such as voice recognition, voice replication, digital recording, and/or telephony functions. Other IO devices 807 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 807 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 810 via a sensor hub (not shown), while other devices such as a keyboard or thermal sensor may be controlled by an embedded controller (not shown), dependent upon the specific configuration or design of system 800.

To provide for persistent storage of information such as data, applications, one or more operating systems and so forth, a mass storage (not shown) may also couple to processor 801. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 801, e.g., via a serial peripheral interface (SPI). This flash device may provide for non-volatile storage of system software, including a basic input/output software (BIOS) as well as other firmware of the system.

Storage device 808 may include computer-accessible storage medium 809 (also known as a machine-readable storage medium or a computer-readable medium) on which is stored one or more sets of instructions or software (e.g., PCIe testing system 828) embodying any one or more of the methodologies or functions described herein. PCIe testing system 828 may also reside, completely or at least partially, within memory 803 and/or within processor 801 during execution thereof by data processing system 800, memory 803 and processor 801 also constituting machine-accessible storage media. PCIe testing system 828 may further be transmitted or received over a network via network interface device 805.

Computer-readable storage medium 809 may also be used to store some software functionalities described above persistently. While computer-readable storage medium 809 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 828, components and other features described herein can be implemented as discrete hardware components or integrated in the functionality of hardware components such as ASICS, FPGAs, DSPs or similar devices. In addition, module/unit/logic 1028 can be implemented as firmware or functional circuitry within hardware devices. Further, module/unit/logic 828 can be implemented in any combination hardware devices and software components.

Note that while system 800 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Also note that the PCIe testing techniques described above can be applied to a variety of different types of data centers, such as, for example, traditional colocation data centers and greenfield data centers. A colocation data center is a type of data center where equipment, space, and bandwidth are available for rental to retail customers. Colocation facilities provide space, power, cool and physical security for the server, storage, and networking equipment of other firms, and connect them to a variety of telecommunications and network service providers with a minimum of cost and complexity. A greenfield data center refers a data center that is built and configured in a location where none exists before. The techniques described above can also be applied to or work in conjunction with a performance optimized data center (POD), or portable on-demand or container data center, where racks of servers are housed in one or more individual containers, modular rooms, or modular housings.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for testing peripheral component interconnect express (PCIe) devices, the method comprising:
   detecting that a plurality of PCIe devices have been inserted into one or more PCIe buses of a data processing system;
   in response to the detection, scanning all PCIe buses of the data processing system to discover the plurality of PCIe devices;
   for each of the PCIe devices discovered,
      repairing and retraining a PCIe link associated with the PCIe device, without rebooting the data processing system, and
      loading a device driver instance for the PCIe device to be hosted by an operating system;
   executing a test routine to concurrently test the plurality of PCIe devices via respective device driver instances;
   in response to a signal indicating that the execution of the test routine has been completed, unloading the device driver instances of the PCIe devices; and
   communicating with the operating system to remove the Me devices from a namespace of the operating system, without rebooting the data processing system.

2. The method of claim 1, wherein loading a device driver instance comprises assigning a logical device identifier (ID) representing the PCIe device to the device driver instance, wherein the logical device ID is constructed based on a combination of one or more of a bus number, a device number, or a function number of the PCIe device.

3. The method of claim 2, wherein the logical device ID is utilized by the device driver instance to identify a physical PCIe slot in which the PCIe device is inserted, such that the plurality of PCIe devices can be concurrently identified and tested.

4. The method of claim 1, further comprising displaying a message to prompt a user that the PCIe devices can be physically removed from corresponding PCIe slots.

5. A computer-implemented method for testing peripheral component interconnect express (PCIe) devices, the method comprising:
   detecting that a plurality of PCIe devices have been inserted into one or more PCIe buses of a data processing system;
   in response to the detection, scanning all Pete buses of the data processing system to discover the plurality of PCIe devices;
   for each of the PCIe devices discovered,
      repairing and retraining a PCIe link associated with the PCIe device, without rebooting the data processing system, wherein repairing and retraining a PCIe link associated with the PCIe device comprises:
         setting a first clock configuration bit in a first PCIe link control register of the PCIe device, and
         setting a second clock configuration bit in a second PCIe link control register of a root complex device coupled to the PCIe device to recover a PCIe reference clock configuration, and
      loading a device driver instance for the PCIe device to be hosted by an operating system; and
   executing a test routine to concurrently test the plurality of PCIe devices via respective device driver instances.

6. The method of claim 5, further comprising setting a retrain link bit in the second PCIe link control register of the root complex device to trigger a PCIe link retraining process.

7. The method of claim 6, further comprising:
   recovering settings of a PCIe device control register of the PCIe device; and
   clearing any error in a PCIe configuration space reported during PCIe bus scanning.

8. The method of claim 7, further comprising copying memory address settings from the root complex device to the PCIe configuration space of the PCIe device.

9. A non-transitory machine-readable medium having instructions stored therein, which when executed by a processor, cause the processor to perform operations for testing PCIe devices, the operations comprising:
   detecting that a plurality of PCIe devices have been inserted into one or more PCIe buses of a data processing system;
   in response to the detection, scanning all PCIe buses of the data processing system to discover the plurality of PCIe devices;
   for each of the PCIe devices discovered,
      repairing and retraining a PCIe link associated with the PCIe device, without rebooting the data processing system, and
      loading a device driver instance for the PCIe device to be hosted by an operating system;
   executing a test routine to concurrently test the plurality of PCIe devices via respective device driver instances;
   in response to a signal indicating that the execution of the test routine has been completed, unloading the device driver instances of the PCIe devices; and
   communicating with the operating system to remove the PCIe devices from a namespace of the operating system, without rebooting the data processing system.

10. The medium of claim 9, wherein loading a device driver instance comprises assigning a logical device identifier (ID) representing the PCIe device to the device driver instance, wherein the logical device ID is constructed based on a combination of one or more of a bus number, a device number, or a function number of the PCIe device.

11. The medium of claim 10, wherein the logical device ID is utilized by the device driver instance to identify a physical PCIe slot in which the PCIe device is inserted, such that the plurality of PCIe devices can be concurrently identified and tested.

12. The medium of claim 9, wherein the operations further comprise displaying a message to prompt a user that the PCIe devices can be physically removed from corresponding PCIe slots.

13. A non-transitory machine-readable medium having instructions stored therein, which when executed b a processor, cause the processor to perform operations for testing PCIe devices, the operations comprising:
   detecting that a plurality of PCIe devices have been inserted into one or more PCIe buses of a data processing system;
   in response to the detection, scanning all PCIe buses of the data processing s stem to discover the plurality of PCIe devices;
   for each of the PCIe devices discovered,
      repairing and retraining a PCIe link associated with the PCIe device, without rebooting the data processing system, wherein repairing and retraining a PCIe link associated with the PCIe device comprises:
         setting a first clock configuration bit in a first PCIe link control register of the PCIe device, and
         setting a second clock configuration bit in a second PCIe link control register of a root complex device coupled to the PCIe device to recover a PCIe reference clock configuration, and
      loading a device driver instance for the PCIe device to be hosted by an operating system; and
   executing a test routine to concurrently test the plurality of PCIe devices via respective device driver instances.

14. The medium of claim 13, wherein the operations further comprise setting a retrain link bit in the second PCIe link control register of the root complex device to trigger a PCIe link retraining process.

15. The medium of claim 14, wherein the operations further comprise:
   recovering settings of a PCIe device control register of the PCIe device; and
   clearing any error in a PCIe configuration space reported during PCIe bus scanning.

16. The medium of claim 15, wherein the operations further comprise copying memory address settings from the root complex device to the PCIe configuration space of the PCIe device.

17. A system, comprising:
   a processor; and
   a memory coupled to the processor for storing instructions, which when executed from the memory, cause the processor to perform operations for testing PCIe devices, the operations including:
      detecting that a plurality of PCIe devices have been inserted into one or more PCIe buses of a data processing system;
      in response to the detection, scanning all PCIe buses of the data processing system to discover the plurality of PCIe devices;
      for each of the PCIe devices discovered,
         repairing and retraining a PCIe link associated with the PCIe device, without rebooting the data processing system, and
         loading a device driver instance for the PCIe device to be hosted by an operating system;
      executing a test routine to concurrently test the plurality of PCIe devices via respective device driver instances,
      in response to a signal indicating that the execution of the test routine has been completed, unloading the device driver instances of the PCIe devices; and
      communicating with the operating system to remove the PCIe devices from a namespace of the operating system, without rebooting the data processing system.

18. The system of claim 17, wherein loading a device driver instance comprises assigning a logical device identifier (ID) representing the PCIe device to the device driver instance, wherein the logical device ID is constructed based on a combination of one or more of a bus number, a device number, or a function number of the PCIe device.

19. The system of claim 18, wherein the logical device ID is utilized by the device driver instance to identify a physical PCIe slot in which the PCIe device is inserted, such that the plurality of PCIe devices can be concurrently identified and tested.

20. The system of claim 17, wherein the operations further comprise displaying a message to prompt a user that the PCIe devices can be physically removed from corresponding PCIe slots.

21. A system, comprising:
   a processor; and
   a memory coupled to the processor for storing instructions, which when executed from the memory, cause the processor to perform operations for testing PCIe devices, the operations including:
      detecting that a plurality of PCIe devices have been inserted into one or more PCIe buses of a data processing system;

in response to the detection, scanning all PCIe buses of the data processing system to discover the plurality of PCIe devices;

for each of the PCIe devices discovered,
   repairing and retraining a PCIe link associated with the PCIe device, without rebooting the data processing system, wherein repairing and retraining a PCIe link associated with the PCIe device comprises:
      setting a first clock configuration bit in a first PCIe link control register of the PCIe device, and
      setting a second clock configuration bit in a second PCIe link control register of a root complex device coupled to the PCIe device to recover a PCIe reference clock configuration, and
   loading a device driver instance for the PCIe device to be hosted by an operating system; and
   executing a test routine to concurrently test the plurality of PCIe devices via respective device driver instances.

22. The system of claim 21, wherein the operations further comprise setting a retrain link bit in the second PCIe link control register of the root complex device to trigger a PCIe link retraining process.

23. The system of claim 22, wherein the operations further comprise:
   recovering settings of a PCIe device control register of the PCIe device; and
   clearing any error in a PCIe configuration space reported during PCIe bus scanning.

24. The system of claim 23, wherein the operations further comprise copying memory address settings from the root complex device to the PCIe configuration space of the PCIe device.

* * * * *